(12) United States Patent
Van Endert

(10) Patent No.: US 7,839,740 B2
(45) Date of Patent: Nov. 23, 2010

(54) RECORDABLE OPTICAL STORAGE SYSTEMS

(75) Inventor: Tony Petrus Van Endert, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 727 days.

(21) Appl. No.: 11/721,820

(22) PCT Filed: Dec. 16, 2005

(86) PCT No.: PCT/IB2005/054285

§ 371 (c)(1),
(2), (4) Date: Jun. 15, 2007

(87) PCT Pub. No.: WO2006/067717

PCT Pub. Date: Jun. 29, 2006

(65) Prior Publication Data

US 2009/0268572 A1    Oct. 29, 2009

(30) Foreign Application Priority Data

Dec. 22, 2004   (EP)   ................... 04106832

(51) Int. Cl.
*G11B 7/00* (2006.01)
(52) U.S. Cl. .................. 369/47.53; 369/47.5; 369/59.1; 369/116
(58) Field of Classification Search .................. None
See application file for complete search history.

(56) References Cited

U.S. PATENT DOCUMENTS

| 6,404,713 | B1 * | 6/2002 | Ueki | ........................ 369/47.53 |
| 2002/0085462 | A1 | 7/2002 | Spruit | |
| 2002/0085463 | A1 * | 7/2002 | Minemura et al. | ........ 369/47.53 |

FOREIGN PATENT DOCUMENTS

| EP | 0404249 A1 | 12/1990 |
| WO | 2004100137 A1 | 11/2004 |

* cited by examiner

Primary Examiner—Muhammad N. Edun

(57) ABSTRACT

A last optimum parameter value control method is disclosed, with a laser parameter value being adjusted in a predetermined sequence at an ADIP/ATIP frame of an optical recording medium. Jitter is measured at each ADIP/ATIP frame in order to obtain an average jitter value for that particular frame, and hence parameter value.

28 Claims, 8 Drawing Sheets

First revolution

| Parameter | Jitter |
|---|---|
| $P_0$ | $\sigma_{0.1}$ |
| $P_1$ | $\sigma_{1.1}$ |
| $P_2$ | $\sigma_{2.1}$ |
| $P_3$ | $\sigma_{3.1}$ |
| $P_4$ | $\sigma_{4.1}$ |
| $P_5$ | $\sigma_{5.1}$ |
| $P_6$ | $\sigma_{6.1}$ |

Second revolution

| Parameter | Jitter |
|---|---|
| $P_0$ | $\sigma_{0.2}$ |
| $P_1$ | $\sigma_{1.2}$ |
| $P_2$ | $\sigma_{2.2}$ |
| $P_3$ | $\sigma_{3.2}$ |
| $P_4$ | $\sigma_{4.2}$ |
| $P_5$ | $\sigma_{5.2}$ |
| $P_6$ | $\sigma_{6.2}$ |

FIG.5

$P: 0 \rightarrow n-2: 0 \rightarrow 5$

| | |
|---|---|
| $Po_0$ | $\sigma rl_0$ |
| $Po_1$ | $\sigma rl_1$ |
| $Po_2$ | $\sigma rl_2$ |
| $Po_3$ | $\sigma rl_3$ |
| $Po_4$ | $\sigma rl_4$ |
| $Po_5$ | $\sigma rl_5$ |
| $Po_6$ | $\sigma rl_6$ |

FIG.6

| First revolution | | Second revolution | |
| --- | --- | --- | --- |
| Parameter | Jitter | Parameter | Jitter |
| $P_0$ | $\sigma_{0.1}$ | $P_0$ | $\sigma_{0.2}$ |
| $P_1$ | $\sigma_{1.1}$ | $P_1$ | $\sigma_{1.2}$ |
| $P_2$ | $\sigma_{2.1}$ | $P_2$ | $\sigma_{2.2}$ |
| $P_3$ | $\sigma_{3.1}$ | $P_3$ | $\sigma_{3.2}$ |
| $P_4$ | $\sigma_{4.1}$ | $P_4$ | $\sigma_{4.2}$ |
| $P_5$ | $\sigma_{5.1}$ | $P_5$ | $\sigma_{5.2}$ |
| $P_6$ | $\sigma_{6.1}$ | $P_6$ | $\sigma_{6.2}$ |

FIG.7

$q: 0 \rightarrow n-3: 0 \rightarrow 4$

| $Po_0$ | $\sigma r1_0$ |
| --- | --- |
| $Po_1$ | $\sigma r1_1$ |
| $Po_2$ | $\sigma r1_2$ |
| $Po_3$ | $\sigma r1_3$ |
| $Po_4$ | $\sigma r1_4$ |
| $Po_5$ | $\sigma r1_5$ |
| $Po_6$ | $\sigma r1_6$ |

FIG.8

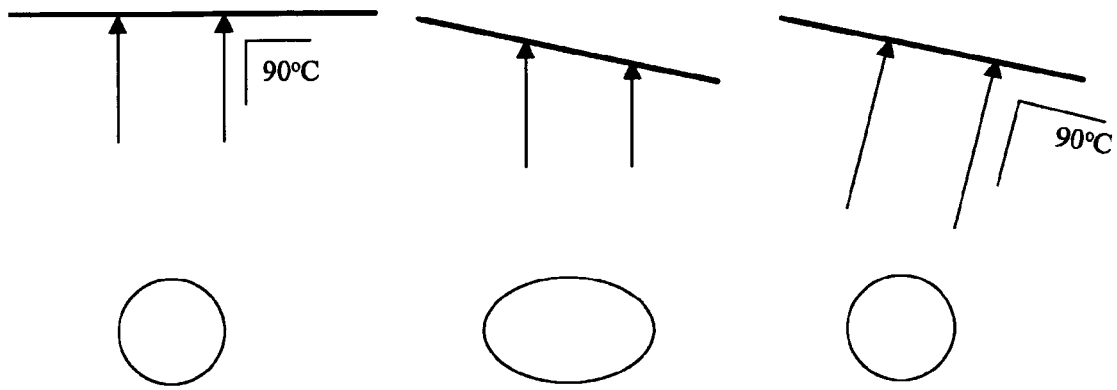
FIG.13a  FIG.13b  FIG.13c
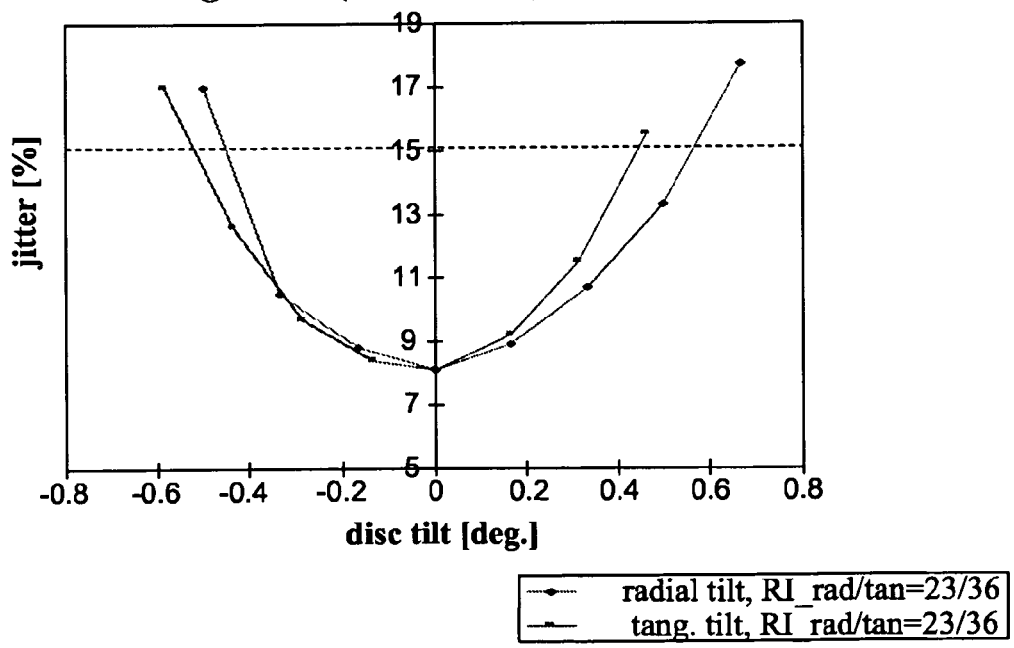
FIG.14

RECORDABLE OPTICAL STORAGE SYSTEMS

The present invention relates generally to recordable optical storage systems, and more specifically to the determination of various optimal read and write parameters for use with recordable optical storage systems and optical storage discs.

As is well known, CD-R (Compact Disc-Recordable) discs and the like are made up of an optical stack. The stack commonly consists of polycarbonate substrate, a sensitive dye layer, a gold or silver alloy reflector and a protective lacquer coating. Data is written to a disc by focusing a high power laser onto the dye layer so as to heat an area such that the reflectivity of the area is altered. The areas form a spiral track of variable length marks (low reflective areas), and lands (highly reflective areas between the marks). The resulting pattern of the marks and lands encodes the data to be stored on the disc. Each transition between a mark area and a land area corresponds to the physical encoding of a data "1" value. The lands are typically 3 to 11 clock cycles in length (3 T to 11 T where 'T' represents the data clock period).

Precise mark length is critical if data is to be represented accurately. For example, if an optical reader reads a disc with a number of 3 T marks or lands that are too long, these could be misinterpreted as 4 T features. This misinterpretation may result in incorrect data retrieval, and, in extreme cases, read-failure.

Furthermore, it is important that the laser writing to or reading from the optical disc is incident on the disc correctly, and further is focused sufficiently so that the correct track is read. If this is not the case errors in writing data as above may occur, and information retrieval may be affected. System parameters that may cause situations such as this to occur, for example, are the presence of spherical aberration, or other distortions of the disc, or the laser not being properly focused on the disc in use.

For these reasons, it is important that optical recorders are able to monitor and maintain the quality of disc writing in order to ensure the accuracy of all the mark and land lengths over the particular disc being written.

In order to achieve accurate mark/land lengths, there will be optimum recording and reading parameters, based on the optimum operating optical path parameter values for the disc/recorder combination being used. The optimum recording parameters that should be used when recording a disc (e.g. CD-R, CD-RW (Compact Disc-ReWritable), DVD±R (DVD Recordable), DVD±RW (DVD ReWritable), DVD-RAM etc.) are therefore dependent upon the actual disc, the recorder being used and also the speed at which the recording is taking place.

The optimum recording and reading parameters should be determined for each recorder/disc combination at the actual recording speed. Such determination is called an Optimum Parameter Control (OPC) procedure. The optimum recording parameters will allow the recorder to produce the correct mark/land lengths for a given disc at a given recording speed, and improve the accuracy of the reading of the optical disc.

Two different OPC procedures are currently in use for Recordable (R), and ReWriteable (RW) optical storage discs. For R-discs 'beta' and 'jitter' (or 'sigma') OPC methods are used, whilst for RW-discs a 'Gamma' method is used as the OPC procedure. The jitter/sigma OPC procedure is one of the most commonly used methods. Jitter is a statistical measurement of the variation in mark or land length around a mean value for each run length, and is a general measure of timing errors which occur when a player/recorder reads data.

These presently used OPC methods are based upon information being used that is pre-stored on the disc. For example, information may be pre-stored onto a disc which provides a recorder with an indicative power level with which to begin an OPC procedure. This information may not, however, always be correct, and can result in OPC failure.

A further disadvantage of presently used jitter/sigma OPC procedures is the requirement for large amounts of disc area in order to average out variations (such as disc eccentricity for example) along the circumference of the disc. The large areas which are needed detract from the space available for data storage, and the tests also take a long time to perform.

There is therefore a need for a fast, space efficient sigma ($\sigma$) OPC method which is also independent of information stored on a disc.

According to the present invention there is provided a fast $\sigma$-OPC procedure that may be executed at inner and/or outer test zones of a disc, and which overcomes the problems associated with conventional jitter OPC procedures.

According to a first aspect of the present invention there is provided a method of determining an optimum parameter value for a laser device for writing to an optical storage medium, the method comprising: writing a predetermined data pattern to the optical storage medium using an optical write head; measuring jitter values for the predetermined data pattern; and selecting an optimum operating output parameter value of the laser device for writing data to the optical storage medium in dependence upon the measured jitter values, the optimum parameter value optimizing the jitter value for the optical storage medium, characterized in that, during writing of the predetermined data pattern to the optical storage medium in a first scan of the medium, an operating optical path parameter value of the optical write head is varied according to a first predetermined profile, and, during writing of the predetermined data pattern to the optical storage medium in a second scan of the medium, the operating optical path parameter value of the optical write head is varied according to a second predetermined profile, different to the first predetermined profile.

According to a second aspect of the present invention there is provided a method of determining an optimum parameter value for a laser device for reading from an optical storage medium, the method comprising: reading a predetermined data pattern from the optical storage medium, using an optical read head; measuring jitter values for the predetermined data pattern; and selecting an optimum operating output parameter value of the laser device for reading data from the optical storage medium in dependence upon the measured jitter values, the optimum parameter value optimizing the jitter value for the optical storage medium, characterized in that, during reading of the predetermined data pattern from the optical storage medium in a first scan of the medium, an operating optical path parameter value of the optical read head is varied according to a first predetermined profile, and during reading of the predetermined data pattern from the optical storage medium in a second scan of the medium, the operating optical path parameter value of the optical read head is varied according to a second predetermined profile, different to the first predetermined profile.

According to a third aspect of the present invention there is provided apparatus for determining an optimum parameter value for a laser device for writing to an optical storage medium, the apparatus comprising: an optical write head, operable to write a predetermined data pattern to the optical storage medium; means for measuring jitter values for the predetermined data pattern; and means selecting an optimum operating parameter value of the laser device for writing data to the optical storage medium in dependence upon the measured jitter values, the optimum parameter value optimizing the jitter value for the optical storage medium, characterized by adjustment means for altering an operating optical path parameter value of the optical write head with respect to the optical storage medium, during writing of the predetermined data pattern to the optical storage medium in a first scan of the medium, to vary the operating optical path parameter value of the optical write head according to a first predetermined profile, and, during writing of the predetermined data pattern to the optical storage medium in a second scan of the medium, to vary the operating optical path parameter value of the optical write head according to a second predetermined profile, different to the first predetermined profile.

According to a fourth aspect of the present invention there is provided an apparatus for determining an optimum parameter value for a laser device for reading from an optical storage medium, the apparatus comprising: an optical read head, operable to read a predetermined data pattern from the optical storage medium; means for measuring jitter values for the predetermined data pattern; and means selecting an optimum operating parameter value of the laser device for reading data from the optical storage medium in dependence upon the measured jitter values, the optimum parameter value optimizing the jitter value for the optical storage medium, characterized by adjustment means for altering an operating optical path parameter value of the optical read head with respect to the optical storage medium, during reading of the predetermined data pattern from the optical storage medium in a first scan of the medium, to vary the operating optical path parameter value of the optical read head according to a first predetermined profile, and, during reading of the predetermined data pattern from the optical storage medium in a second scan of the medium, to vary the operating optical path parameter value of the optical read head according to a second predetermined profile, different to the first predetermined profile.

The operating optical path parameter value is stepped every ADIP/ATIP (Address in Pre-groove/Absolute Time in Pre-groove) frame, and at each parameter value step jitter is measured a number times (after writing is finished) in order to obtain an average for that ADIP/ATIP frame (and hence parameter value level).

According to the present invention, the operating optical path parameter value may also be stepped a number of times per ADIP/ATIP frame.

The method of the present invention provides significant advantages over presently used OPC procedures in terms of speed, disc space usage, and due to the fact that it may be used for all recordable optical storage disc media independently of the information pre-stored thereon (e.g. CD-R, CD-RW, DVD±R, DVD±RW, DVD±R_DL (DL=Double Layer), DVD±RW_DL, DVD-RAM and Blu-Ray discs etc.)

In an exemplary embodiment of the present invention, a two-track jitter OPC procedure is provided.

In preferred embodiments of the present invention examples of the operating optical path parameter values that can be varied include the angle of incidence of a light path between the optical read/write head and the optical storage medium in use.

Optimization of these optical path parameters may improve reading from and writing to discs which are distorted, or subject to spherical aberration.

In further preferred embodiments of the present invention examples of the operating optical path parameter values that can be varied include the optical path length between the optical read/write head and the optical storage medium.

Optimization of this optical parameter may improve reading from and writing to discs when the focus of a light beam from the optical read/write head alters during the use of the laser device.

The invention will now be explained in more detail and with reference to the accompanying Figures, in which FIG. 1 represents a side view of typical CD-RW disc;

FIG. 5 depicts arrays of parameter and jitter values according to an exemplary embodiment of the present invention;

FIG. 6 depicts arrays of average parameter and jitter values according to an exemplary embodiment of the present invention;

Figure 9:
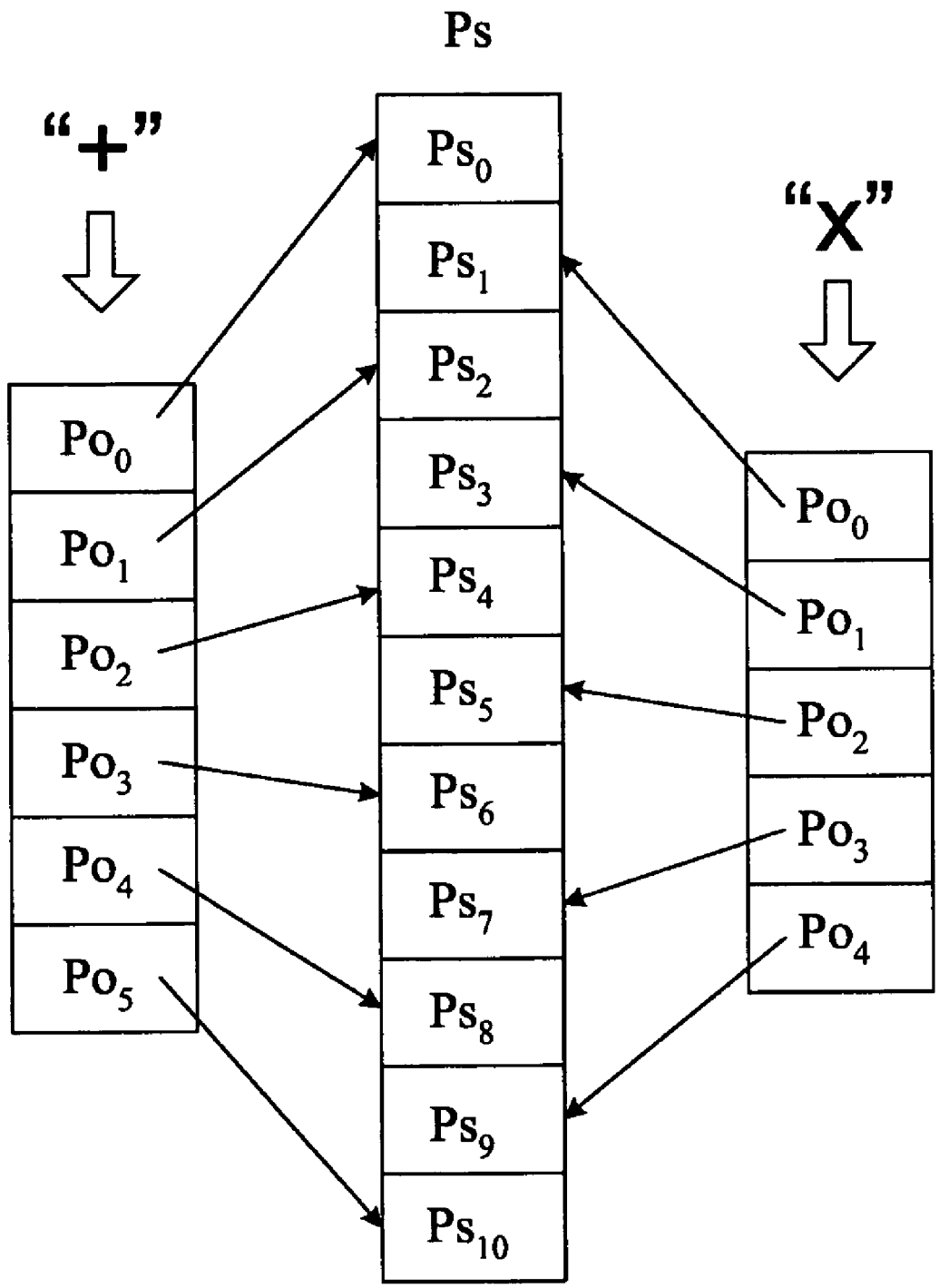
Figure 10:
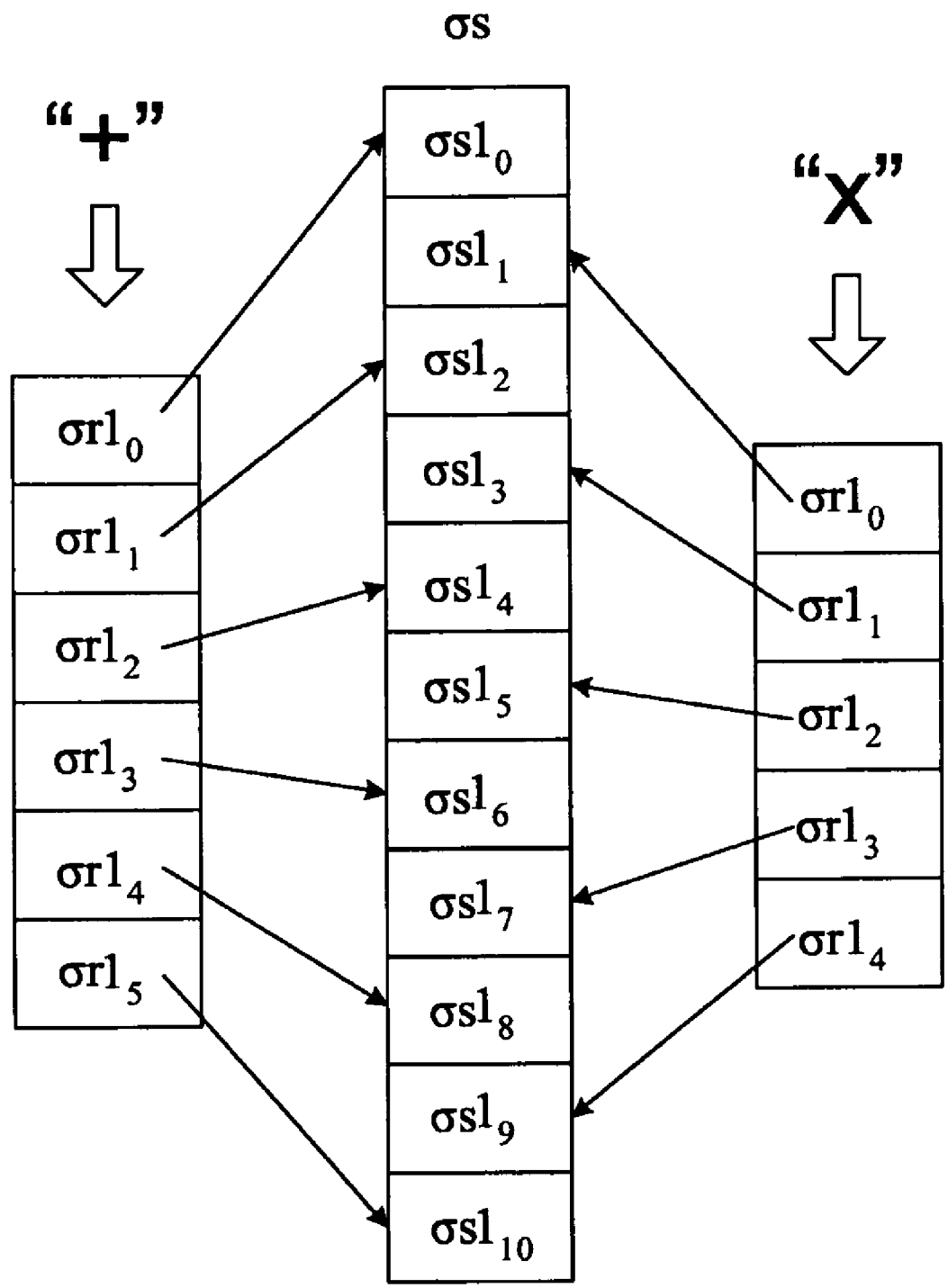
Figure 11:
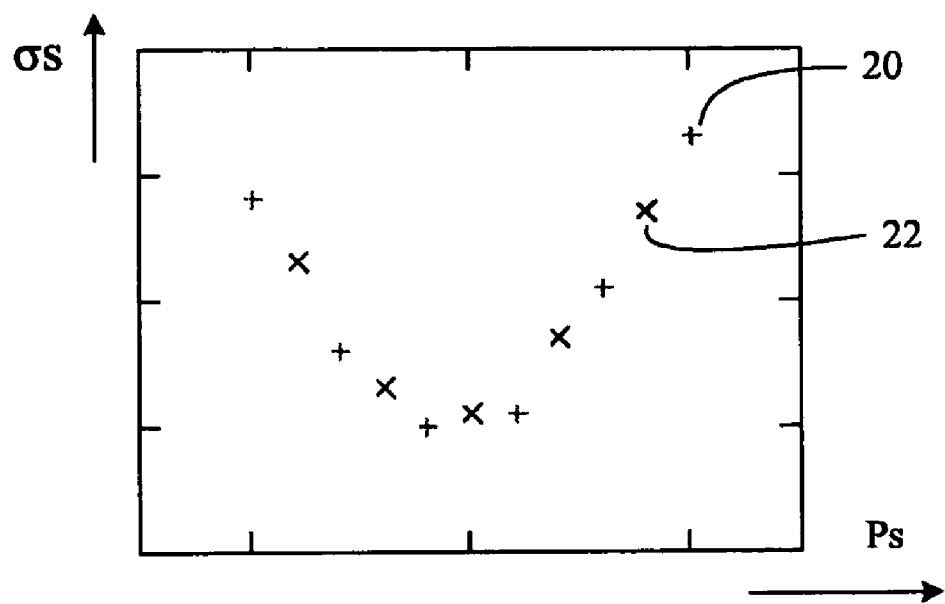
Figure 12:
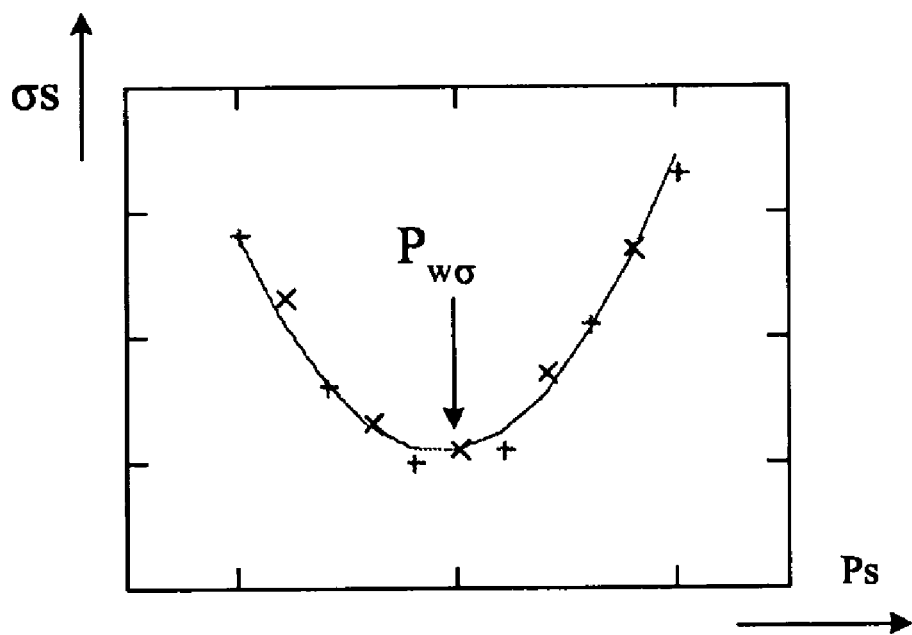

FIG. 7 further depicts arrays of parameter and jitter values according to an exemplary embodiment of the present invention;

FIG. 8 further depicts arrays of average parameter and jitter values according to an exemplary embodiment of the present invention;

FIG. 9 depicts an array of average parameter values according to an exemplary embodiment of the present invention;

FIG. 10 depicts an array of average jitter values according to an exemplary embodiment of the present invention;

FIG. 11 is a graph of average jitter measurement versus average parameter level in accordance with an exemplary embodiment of the present invention;

FIG. 12 is a further graph of average jitter measurement versus average parameter level in accordance with an exemplary embodiment of the present invention;

FIGS. 13a, 13b and 13c show light from a laser incident on an optical disc, and the corresponding cross section of the laser beam contacting the disc; and, FIG. 14 is a graph of jitter values measured versus disc tilt in accordance with an exemplary embodiment of the present invention.

The σ-OPC procedure of the present invention is executed using the test zones of a disc. In order to provide fast and space efficient OPC, an embodiment of the present invention provides an σ-OPC procedure using only two revolutions of the disc.

Although the present invention will be described primarily with reference to CD-R(W) and DVD-R(W) discs, it will be appreciated that the present invention is applicable to any optical recording medium where optimum parameters are desired for writing information to the medium or reading information from the medium. For example the present invention is also applicable, but not limited, to DVD-R_DL, DVD-RW_DL, and Blu-Ray discs etc.

Figure 1:
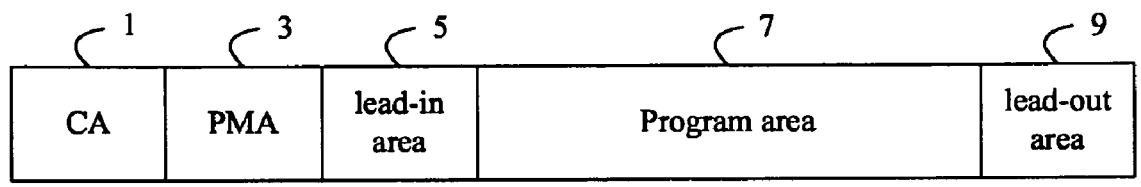

FIG. 1 shows a side view of a standard CD-RW disc. A '-calibration area' (CA) 1 is defined as a test zone for the disc, and any OPC procedure is generally carried out in this region of the disc. A program memory area (PMA) 3, lead-in and lead-out areas 5,9 and program area 7 are provided on the disc, but are not relevant to the present invention, and will not therefore be discussed. The areas 3, 5, 7, and 9 are merely included for completeness, and to emphasize that the present invention is applicable to all standard disc types. However, it is not necessary to include this test zone on all discs; and may only be needed on recordable discs that are intended to have data written to them subsequently.

The present invention utilizes so-called 'ADIP' (ADdress in Pre-Groove) and 'ATIP' (Absolute Time In Pre-Groove) frames present on optical recording media.

All discs have a pre-cut spiral groove that oscillates slightly. The groove keeps the write head tracking properly, and the oscillation (sinusoidal with a frequency of 22.05 KHz at nominal speed for CD-R(W) discs) provides timing information to the recorder.

The oscillation is frequency-modulated with a +/−1 KHz signal, which creates an absolute time clocking signal, known as the Absolute Time In Pregroove (ATIP). The oscillation can therefore be thought of as providing a timing signal. For DVD+R(W) discs the oscillation has a frequency of 817 kHz at nominal speed. For DVD-R(W) discs the frequency of oscillation at nominal speed is 140.6 kHz. Timing information comes from this modulated signal.

When information is read from the disc the oscillation can be demodulated to form the timing signal from which time information may be derived. Thus the position on the disc during writing/reading can be determined by this ATIP (Absolute Time In Pre-groove) information.

For DVD+R(W) discs there is a phase modulated time signal. In the same fashion to CD-R(W) discs, time information may be derived from the phase oscillation in order to give the position of the disc during reading/writing. This information is called ADIP (ADdress In Pre-groove) for DVD-R(W) discs.

There are certain numbers of ADIP/ATIP frames per disc revolution. According to the present invention, the OPC procedure is carried out on a small area of a disc, so that a constant number of ATIP/ADIP frames per revolution are used. Specifically, according to an exemplary embodiment of the present invention, 9 ATIPs frames are used for CD-R(W) discs, and 7 ADIP frames are used for DVD-R(W) discs per revolution (at the inside of the optical disc).

Figure 2:
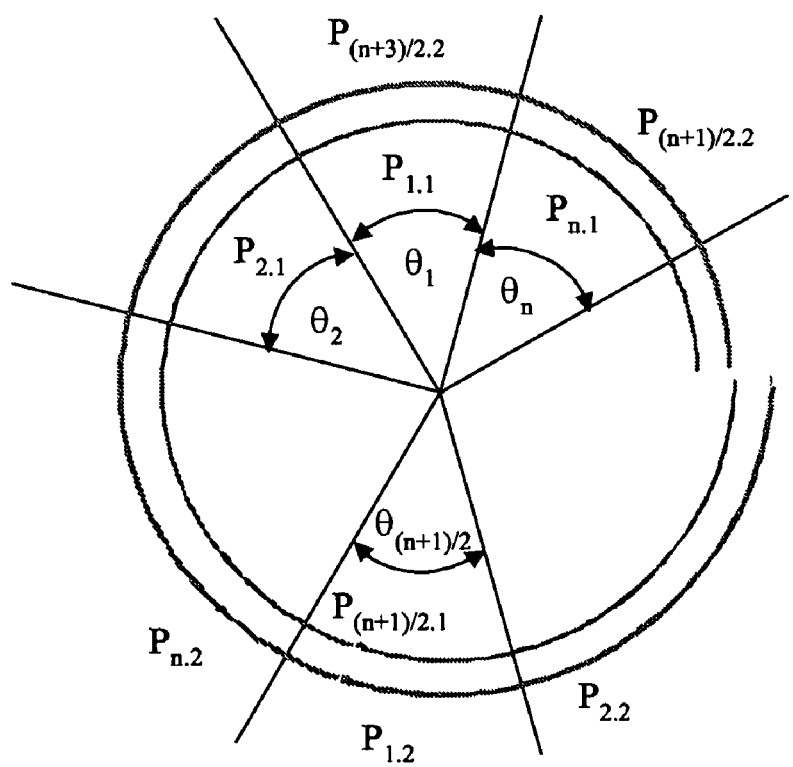
FIG. 2 represents a two-track OPC procedure in accordance with the present invention.
Figure 3:
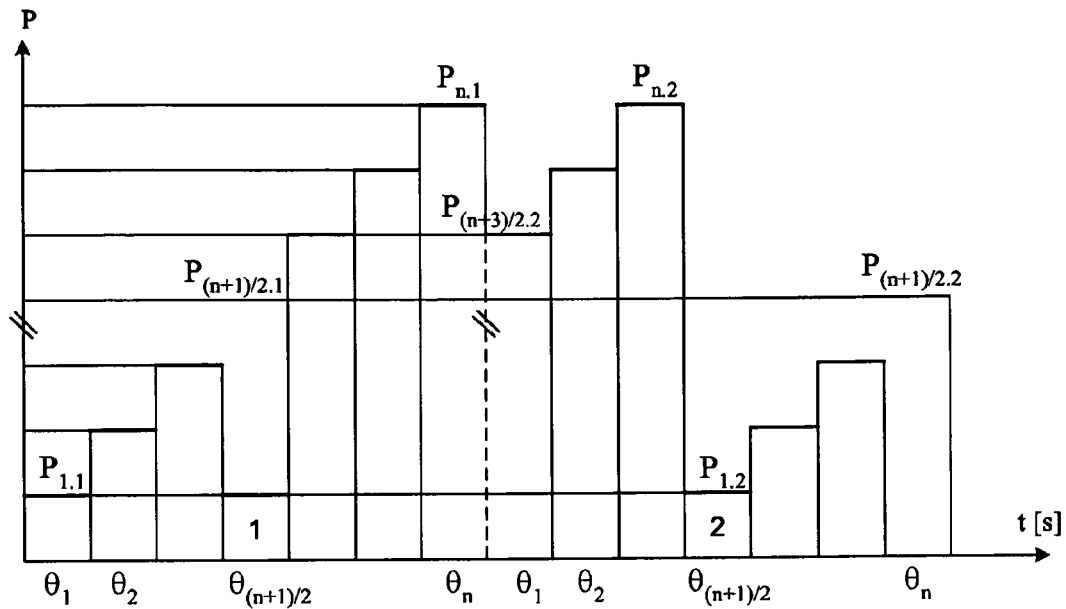
FIG. 3 is a graph representing adjustments made to parameter values in accordance with the present invention.

FIG. 2 shows a two-track σ-OPC procedure in accordance with the present invention, and FIG. 3 illustrates parameter level changes during that procedure.

According to the embodiment exemplified by FIGS. 2 and 3, the parameter values (optimum optical path parameters) are changed for each ADIP/ATIP frame, θ. The parameter values are determined by dividing the difference between the minimum and maximum parameter values available for a given recorder/disc combination and the number of steps required. The minimum and maximum parameter values may, for example be pre-programmed parameters of the recorder.

Alternatively, a standard start parameter value could be used which is then stepped by a predetermined amount every time a new parameter value level is required.

During a first revolution, test data is written to a disc at a particular parameter value in an ADIP/ATIP frame. The parameter value is then adjusted as shown in FIG. 3 and the test data is written to the next ADIP/ATIP frame at this new parameter value. The procedure continues for the first revolution of the disc until the desired number of parameter values have been sampled. The same procedure is then followed for a second revolution with the parameter values changed as shown in FIG. 3.

As shown in FIG. 2, the parameter value changes during the second revolution 11 are different in sequence to those used during the first revolution 13. This shift ensures that ADIP/ATIP frames written with a given parameter value during the first and second revolutions will not coincide on the disc.

According to the exemplary embodiment of the present invention as shown in FIGS. 2 and 3, at the start of writing the next track 11 the sequence of parameter values 103 are changed as shown in FIG. 3. In this way, any possible problems associated with non-homogeneities of the disc along its circumference are averaged out.

Specifically, adjacent ATIP/ADIP frames in concentric tracks do not contain information written at the same parameter value. As a result, a non-homogeneity along the circumference of the disc will not cause an anomalous reading at a particular parameter value.

After writing according to the sequence as depicted in FIG. 3, where a predetermined data pattern is written to a test region of the disc, jitter is measured a number of times at every ADIP/ATIP frame, and is averaged. Jitter may be measured using conventional techniques. For example, a timing measurement circuit in the recorder/player in question may be used in order to provide jitter measurements in relation to a clock signal for example.

A similar process can also be used for discs that are to be read only (for example by a read-only DVD player, or CD-ROM player). However, in this case, the disc reader reads some data from the disc created during writing, and calculates the jitter for this data using the same algorithms. Subsequent reading of the disk is carried out with the optimum optical path parameter values.

Similarly, the data read after the disc is written need not be data written in a test portion, but may be the actual data, written on a portion of a disc. For example in a recording event, a portion of the data can be written to the disc, and then a calibration calculation could be performed based on this data already written to the disc (i.e. predetermined data).

Figure 4:
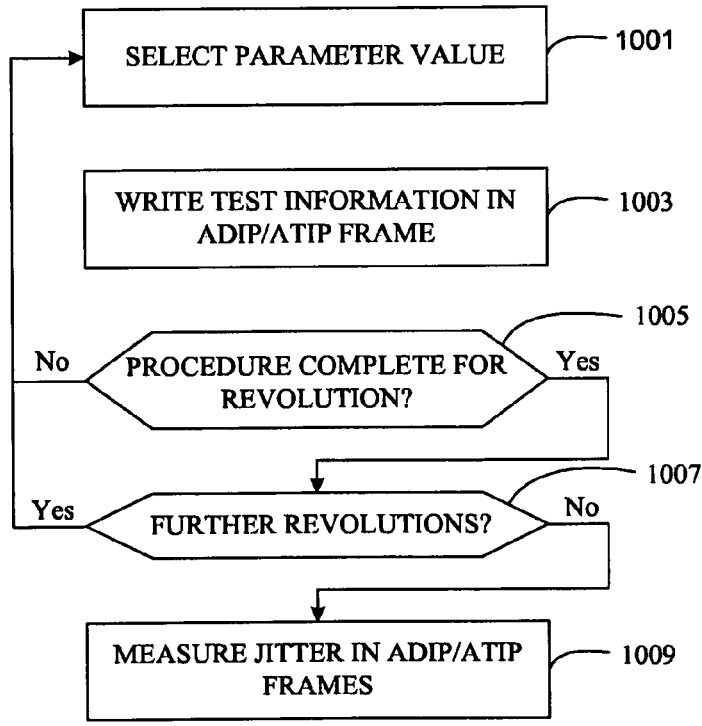
FIG. 4 is a flow chart of the method of the present invention.

The method of the present invention as exemplified by FIGS. 2 and 3 is depicted diagrammatically in FIG. 4 which shows a flow chart in accordance with the method of the present invention.

At step 1001, a parameter value is selected by the recorder. At step 1003, test information is written to an ADIP/ATIP frame using the parameter value selected at step 1001. At step 1005, the recorder determines whether the procedure is complete for a particular revolution, i.e. if all necessary parameter values have been sampled. If yes, then it is determined at step 1007 whether further revolutions for the OPC procedure are required.

If further measurements are deemed necessary at step 1005, a new parameter value is selected at step 1001, and the OPC procedure continues.

If further revolutions are necessary at step 1007, a new parameter value is selected for the new revolution at step 1001. Alternatively, if no further revolutions are required, jitter is measured for the revolutions at step 1009.

Therefore, the method as outlined in FIG. 4 is repeated for each revolution of the disc. Jitter measurements start after the writing has been completed for each revolution.

It will be appreciated that the laser parameter values need not necessarily be adjusted as depicted in FIG. 3, but may be adjusted in any manner provided that adjacent ADIP/ATIP frames in concentric tracks are not written with the same parameter value for the reasons outlined above.

When using an inner disc test zone, for example, 7 ADIP frames (for DVD+R(W)) are used per revolution, or 9 ATIP frames (for CD-R(W)) are used per revolution.

After writing with the different values on ADIP/ATIP frame positions, jitter is measured. Once jitter has been measured at each ADIP/ATIP frame, enough information is available to average out the variations along the circumference of the disc. This will be explained in more detail below.

A table is shown below, which shows the jitter measurements for the parameter values used during the test revolutions. In the table, n is the number of ADIP/ATIP frames that are written per revolution during the OPC procedure.

| Parameter value | Jitter Measurement (1st revolution) | Jitter Measurement (2nd revolution) |
| --- | --- | --- |
| $P_0$ | $\sigma_{0.1}$ | $\sigma_{0.2}$ |
| ... | ... | ... |
| $P_{n-1}$ | $\sigma_{(n-1).1}$ | $\sigma_{(n-1).2}$ |

FIG. 5 is a diagrammatic representation of two arrays obtained for parameter and jitter measurements using seven parameter values per revolution for two revolutions. Jitter is measured at each parameter value for each revolution. For example, during a first revolution at a parameter value $P_0$, a jitter value $\sigma_{0.1}$ is obtained. Here, the subscript 0.1 indicates that it is the first (1) jitter measurement obtained from the first (zeroth) parameter value (0). Similarly, the seventh (6) jitter measurement (i.e. at the seventh parameter value) during the second (2) revolution is a $\sigma_{6.2}$. The results are arranged in parameter value order $P_0$ to $P_6$, even though the parameter values are applied in different orders for the different revolutions.

FIG. 6 depicts how, in an exemplary embodiment, the results from the measurements of FIG. 5 are averaged, the results of which are placed into two new arrays for and jitter respectively.

In FIG. 6, two consecutive and jitter values for both a first and a second revolution are averaged to provide the values of the new array. So, for example, the first two parameter values for each revolution are $P_0$ and $P_1$, and the corresponding jitter measurements for the first and second revolutions are $\sigma_{0.1}$, $\sigma_{1.1}$ and $\sigma_{0.2}$, $\sigma_{1.2}$ respectively. The two parameter values are averaged to give the value $Po_0$ according to equation (1) below, and the four jitter measurements for the two revolutions at the two parameter values are averaged to give $\sigma r1_0$ according to equation (2) below.

Therefore, averaging two consecutive parameter and jitter values (as described above) is performed using the following equations:

$$Po_p = \frac{P_p + P_{p+1}}{2} \forall\, p \in N : 0 \leq p \leq n-2 \tag{1}$$

$$\sigma r1_p = \frac{\sigma_{p.1} + \sigma_{p.2} + \sigma_{(p+1).1} + \sigma_{(p+1).2}}{4} \forall\, p \in N : 0 \leq p \leq n-2 \tag{2}$$

Similarly, FIGS. 7 and 8 show how three consecutive parameter and jitter values are averaged and placed into two further new arrays according to equations (3) and (4) below.

Therefore, averaging of three consecutive and jitter values of the above table is performed using the following equations:

$$Po_q = \frac{P_q + P_{q+1} + P_{q+2}}{3} \forall\, q \in N : 0 \leq q \leq n-3 \tag{3}$$

$$\sigma r2_q = \frac{\sigma_{q.1} + \sigma_{q.2} + \sigma_{(q+1).1} + \sigma_{(q+1).2} + \sigma_{(q+2).1} + \sigma_{(q+2).2}}{6} \forall\, q \in N : 0 \leq q \leq n-3 \tag{4}$$

The values from the four new arrays are now placed into two arrays as shown in FIGS. 9 and 10.

The four parameter/jitter arrays defined by equations (1) to (4) may now be stored into the two separate arrays given below:

$$Ps_{2p} = Po_p, \sigma s_{2p} = \sigma r1_p \; \forall p \in N : 0 \leq p \leq n-2 \tag{5}$$

$$Ps_{2.q+1} = Po_q, \sigma s_{2.q+1} = \sigma r2_q \; \forall q \in N : 0 \leq q \leq n-3 \tag{6}$$

This has the advantage of providing more samples which will enable a more accurate fit to be obtained when the average jitter is plotted against the average parameter value.

It has been observed that the relationship between the averaged parameter values $P_s$, and the averaged jitter values $\sigma_s$ is quadratic in nature as depicted in FIG. 11. The "+" marks 20 represent two averaged parameter and jitter values, and the "x" marks 22 represent three averaged parameter and jitter values.

In order to determine the parameter value that represents the minimum level of jitter, the minimum of the function relating $\sigma_s$ and $P_s$ ($\sigma_s = f(P_s)$) should be found (ideally by second order curve fitting). Given that the new function is observed to be quadratic, by finding solutions to the equation (in which a, b and c are constants):

$$\sigma_s = aP_s^2 + bP_s + c \tag{7}$$

when $$\frac{d\sigma_s}{dP_s} = 0,$$

we can calculate $P_s = P_{w\sigma}$ where $P_{w\sigma}$ is the optimal parameter value.

FIG. 12 shows a typical plot of $\sigma_s$ vs. $P_s$. When $$\frac{d\sigma_s}{dP_s} = 0,$$

we have:

$$2aP_{w\sigma} + b = 0 \tag{8}$$

and so $$P_{w\sigma} = \frac{-b}{2a} \tag{9}$$

where a and b are coefficients obtained from the polynomial regression. The new optimal parameter value $P_{w\sigma}$ corresponds to a minimal jitter value of the fitted curve.

Therefore, $P_{w\sigma}$ is the optimum laser write parameter value, i.e. the laser parameter value that produces the minimum jitter value of the fitted curve, which is symmetrical about this minimum for a given disc/recorder combination at a given write speed.

It will be appreciated that in the exemplary embodiment given above, averages of two and three parameter and jitter values were used in order to calculate the optimum read/write parameters. Averages over a larger or smaller number of parameter values and associated jitter values are also possible however, and the above is only to illustrate the present invention. For example, if even greater accuracy of $P_{w\sigma}$ is required, an average over 2, 3, 4 and 5 parameter values and associated jitter values could be used to obtain the curve of FIG. 12.

As mentioned above, examples of the operating optical path parameter values that can be optimized include the angle of incidence of a light beam from the read/write head on an optical disc present the optical system in use (which may be important where the surface of the disc is distorted), and the optical path length between the laser and an optical disc in the optical storage system. These will be discussed below in more detail.

FIG. 13a shows a laser beam striking a disc with no distortion. The laser beam strikes the disc at a 90°, so that the cross section of the beam is circular. In this case, the beam will be directed towards the centers of the tracks of the disc and the danger of stored information being retrieved incorrectly is minimized.

However, the optical disc may become distorted. For example, the disc may be subject to local radial tilt (i.e. warping in the radial direction), as shown in FIG. 13b. In this case the beam does not strike the disc perpendicularly to the plane of the disc. This means that the cross section of the beam hitting the disc is elongated, and becomes elliptical, as shown in the Figure. Therefore, the accuracy of directing the spot onto the disc is compromised, and read and write errors may be generated on the portion of the disc with the local distortion.

In order to optimize the parameter of the local disc topology the laser and/or the optical pickup unit are tilted by an actuator. The disc is then written under conditions of different tilt, for several revolutions as discussed above. Jitter is then measured for the different values of the tilt, and an optimum value calculated.

FIG. 14 is a graph of various values of disc tilt against the calculated jitter value. A best-fit curve can then be plotted through the points, and the optimum value determined.

Once this optimum value has been determined, the disc is recorded or played with the optical read/write means at this tilt value. This can be seen from FIG. 13c, which shows the laser beam being directed so that it strikes the disc normally, even though the disc has a local distortion.

A further parameter that can be optimized using this method is the optical path between the read/write head and the disc where there the disc is distorted with a tangential tilt (i.e. where the direction of tilt of the disc is in the tangential direction), and spherical aberration of the disc. The latter is not usually a problem in optical discs such as CDs or DVDs, but may manifest itself in blue ray discs, which utilize blue lasers.

Furthermore, problems may occur in reading and writing of discs when the laser beam becomes defocused. Initially, a laser beam is focused on the disc using an actuator. However, in use, changes may occur in the OPU or in the electronics operating the system, due to a change in temperature, for example. These may affect the focusing of the spot, with the effect that the beam becomes focused on a point either above or below the disc.

Obviously, if the beam is not correctly focused on the disc the area of the beam striking the disc would be larger than the optimum size. This may affect the reading of or the writing to the disc as discussed above.

The parameter of the beam focus/optical path length can be optimized by using the present invention; as the disc is written or read the actuator moves the laser to alter the focus of the laser on the disc. Jitter values are then calculated corresponding to these. Once the jitter values have been calculated, an optimum value can be determined, by fitting a second-order polynomial curve to a graph on which the values are plotted, for example.

During writing of the disc, or during playback the system can adjust the focus of the laser accordingly, to prevent the laser beam from becoming defocused.

As discussed above, the optical parameter value for which the jitter value is optimized is determined. This optimum value is usually the minimum jitter value. However, in certain cases it may be advantageous not to use the parameter value corresponding to the minimum jitter during subsequent writing/playback of the disc. This may be the case if the curve of a graph of parameter value versus jitter is not symmetrical. For example, if the curve is very steep on one side of the optimum value, but shallow on the other, a parameter value which is on the shallow curve may be selected. This is because it may be important to have a margin in which the parameter value can change slightly, without having a significant effect on the jitter related to that particular parameter value. If this was not the case, a small change in the parameter value could have potentially damaging effects on the quality of the information stored on the disc or on the quality of the information recalled from the disc. Hence, a symmetrical value, rather than an optimum value is sometimes used.

The invention claimed is:

1. A method of determining an optimum parameter value for a laser device for writing to an optical storage medium, the method comprising:
   writing a predetermined data pattern to the optical storage medium using an optical write head;
   measuring jitter values for the predetermined data pattern; and
   selecting an optimum operating output parameter value of the laser device for writing data to the optical storage medium in dependence upon the measured jitter values, the optimum parameter value optimizing the jitter value for the optical storage medium,
   characterized in that, during writing of the predetermined data pattern to the optical storage medium in a first scan of the medium, an operating optical path parameter value of the optical write head is varied according to a first predetermined profile, and, during writing of the predetermined data pattern to the optical storage medium in a second scan of the medium, the operating optical path parameter value of the optical write head is varied according to a second predetermined profile, different to the first predetermined profile.

2. A method as claimed in claim 1, wherein the predetermined profiles comprise a plurality of operating optical path parameter value steps.

3. A method as claimed in claim 2, wherein at least one jitter value is measured for each of the operating optical path parameter value steps of the first and second predetermined profiles.

4. A method as claimed in claim 3, wherein the step of selecting the optimum operating optical path parameter value comprises:
   determining a function which relates jitter value to the operating optical path parameter value, over the range of operating optical path parameter values in the first and second predetermined profiles;
   determining from said function an optimum operating optical path parameter value that minimizes the jitter value.

5. A method as claimed in claim 4, wherein the step of determining the function relating jitter value to the operating optical path parameter value comprises:

for respective pairs of consecutive operating optical path parameter values, obtaining respective average operating optical path parameter values and respective average jitter values from the jitter values corresponding to those consecutive operating optical path parameter values; and determining a function which relates the average jitter values to the average operating optical path parameter values.

6. A method as claimed in claim 5, wherein the function is a quadratic function of the form $\sigma=aP^2+bP+C$, where $\sigma$ represents jitter value, P represents the operating optical path parameter value and a, b and c are constants, and the optimum operating optical path parameter value is determined by setting the differential of the function to zero ($d\sigma/dP=0$, $P_{optimum}=-b/2a$).

7. A method as claimed in claim 4, wherein the step of determining the function relating jitter value to the operating optical path parameter value comprises:

for respective triads of consecutive operating optical path parameter values, obtaining respective average operating optical path parameter values and respective average jitter values from the jitter values corresponding to those consecutive operating optical path parameter values; and determining a function which relates the average jitter values to the average operating optical path parameter values.

8. A method as claimed in claim 4, wherein the step of determining the function relating jitter value to the operating optical path parameter value comprises:

for respective pairs of consecutive operating optical path parameter values, obtaining respective average operating optical path parameter values and respective average jitter values from the jitter values corresponding to those consecutive operating optical path parameter values;

for respective triads of consecutive operating optical path parameter values, obtaining respective average operating optical path parameter values and respective average jitter values from the jitter values corresponding to those consecutive operating optical path parameter values; and determining a function which relates the average jitter values to the average operating optical path parameter values.

9. A method as claimed in claim 1, wherein the optical storage medium is a disc having address in pre-groove frames (ADIP) defined therein, and wherein the operating optical path parameter value is varied for each ADIP frame of the disc.

10. A method as claimed in claim 1, wherein the optical storage medium is a disc having absolute time in pre-groove frames defined therein, and wherein the operating optical path parameter value is varied for each ATIP frame of the disc.

11. A method as claimed in claim 1, wherein the optical recording medium comprises one of CD-R, CD-RW, DVD-R, DVD-RW, DVD-R_DL, DVD-RW_DL, DVD+R, DVD+RW, DVD+R_DL, DVD+RW_DL, DVD-RAM or Blu-Ray discs.

12. A method as claimed in claim 1 wherein the predetermined data pattern is formed on a test region of the optical storage device.

13. A method as claimed in claim 1 wherein the operating optical path parameter value comprises an angle of incidence of a light path from the optical read/write head on the optical storage medium in use.

14. A method as claimed in claim 1 wherein the operating optical path parameter value comprises the optical path length between the optical read/write head and the optical storage medium in use.

15. An optical storage medium made by the method of claim 1.

16. A method of determining an optimum parameter value for a laser device for reading from an optical storage medium, the method comprising:

reading a predetermined data pattern from the optical storage medium, using an optical read head;

measuring jitter values for the predetermined data pattern; and selecting an optimum operating output parameter value of the laser device for reading data from the optical storage medium in dependence upon the measured jitter values, the optimum parameter value optimizing the jitter value for the optical storage medium, characterized in that, during reading of the predetermined data pattern from the optical storage medium in a first scan of the medium, an operating optical path parameter value of the optical read head is varied according to a first predetermined profile, and during reading of the predetermined data pattern from the optical storage medium in a second scan of the medium, the operating optical path parameter value of the optical read head is varied according to a second predetermined profile, different to the first predetermined profile.

17. Apparatus for determining an optimum parameter value for a laser device for writing to an optical storage medium, the apparatus comprising:

an optical write head, operable to write a predetermined data pattern to the optical storage medium;

means for measuring jitter values for the predetermined data pattern; and means selecting an optimum operating parameter value of the laser device for writing data to the optical storage medium in dependence upon the measured jitter values, the optimum parameter value optimizing the jitter value for the optical storage medium, characterized by adjustment means for altering an operating optical path parameter value of the optical write head with respect to the optical storage medium, during writing of the predetermined data pattern to the optical storage medium in a first scan of the medium, to vary the operating optical path parameter value of the optical write head according to a first predetermined profile, and, during writing of the predetermined data pattern to the optical storage medium in a second scan of the medium, to vary the operating optical path parameter value of the optical write head according to a second predetermined profile, different to the first predetermined profile.

18. Apparatus as claimed in claim 17, wherein said means for selecting the optimum operating optical path parameter value comprises:

means for determining a function which relates jitter value to the operating optical path parameter value, over the range of operating optical path parameter values in the first and second predetermined profiles;

means for determining from said function an optimum operating optical path parameter value that minimizes the jitter value.

19. Apparatus as claimed in claim 18, wherein said means for determining the function relating jitter value to the operating optical path parameter value comprises:

means for obtaining, for respective pairs of consecutive operating optical path parameter values, respective average operating optical path parameter values and respective average jitter values from the jitter values corresponding to those consecutive operating optical path parameter values; and means for determining a function which relates the average jitter values to the average operating optical path parameter values.

20. Apparatus as claimed in claim 18, wherein said means for determining the function relating jitter value to the operating optical path parameter value comprises:

means for obtaining, for respective triads of consecutive operating optical path parameter values, respective average operating optical path parameter values and respective average jitter values from the jitter values corresponding to those consecutive operating optical path parameter values; and means for determining a function which relates the average jitter values to the average operating optical path parameter values.

21. Apparatus as claimed in claim 18, wherein said means for determining the function relating jitter value to the operating optical path parameter value comprises:

means for obtaining, for respective pairs of consecutive operating optical path parameter values, respective average operating optical path parameter values and respective average jitter values from the jitter values corresponding to those consecutive operating optical path parameter values;

means for obtaining, for respective triads of consecutive operating optical path parameter values, respective average operating optical path parameter values and respective average jitter values from the jitter values corresponding to those consecutive operating optical path parameter values; and means for determining a function which relates the average jitter values to the average operating optical path parameter values.

22. Apparatus as claimed in claim 17, wherein the optical storage medium is a disc having address in pre-groove frames (ADIP) defined therein, and wherein said adjustment means is operable to vary the operating optical path parameter value for each ADIP frame of the disc.

23. Apparatus as claimed in claim 17, wherein the optical storage medium is a disc having absolute time in pre-groove frames defined therein, and wherein said adjustment means is operable to vary the operating optical path parameter value for each ATIP frame of the disc.

24. Apparatus as claimed in claim 17, wherein the optical storage medium comprises one of CD-R, CD-RW, DVD-R, DVD-RW, DVD-R_DL, DVD-RW_DL, DVD+R, DVD+RW, DVD+R_DL, DVD+RW_DL, DVD-RAM or Blu-Ray discs.

25. Apparatus as claimed in claim 17 wherein the predetermined data pattern is formed on a test region of the optical storage device.

26. Apparatus as claimed in claim 17 wherein the operating optical path parameter value comprises an angle of incidence of a light path from the optical read/write head on the optical storage medium in use.

27. Apparatus as claimed in claim 17 wherein the operating optical path parameter value comprises the optical path length between the optical read/write head and the optical storage medium in use.

28. An apparatus for determining an optimum parameter value for a laser device for reading from an optical storage medium, the apparatus comprising:

an optical read head, operable to read a predetermined data pattern from the optical storage medium;

means for measuring jitter values for the predetermined data pattern; and means selecting an optimum operating parameter value of the laser device for reading data from the optical storage medium in dependence upon the measured jitter values, the optimum parameter value optimizing the jitter value for the optical storage medium, characterized by adjustment means for altering an operating optical path parameter value of the optical read head with respect to the optical storage medium, during reading of the predetermined data pattern from the optical storage medium in a first scan of the medium, to vary the operating optical path parameter value of the optical read head according to a first predetermined profile, and, during reading of the predetermined data pattern from the optical storage medium in a second scan of the medium, to vary the operating optical path parameter value of the optical read head according to a second predetermined profile, different to the first predetermined profile.

* * * * *